United States Patent
Sano

(10) Patent No.: US 10,372,395 B2
(45) Date of Patent: Aug. 6, 2019

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Jumpei Sano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/442,258

(22) Filed: Feb. 24, 2017

(65) Prior Publication Data
US 2017/0160999 A1    Jun. 8, 2017

Related U.S. Application Data

(63) Continuation of application No. 14/701,303, filed on Apr. 30, 2015, now Pat. No. 9,619,193.

(30) Foreign Application Priority Data

May 2, 2014    (JP) ................................. 2014-095129

(51) Int. Cl.
*G06F 3/12* (2006.01)
*H04N 1/00* (2006.01)
*G06K 15/00* (2006.01)

(52) U.S. Cl.
CPC ............ *G06F 3/1273* (2013.01); *G06F 3/121* (2013.01); *G06F 3/126* (2013.01); *G06F 3/1207* (2013.01); *G06F 3/1285* (2013.01); *G06F 3/1296* (2013.01); *G06F 3/1297* (2013.01); *H04N 1/00* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

2011/0279858 A1 * 11/2011  Kano .................... G06F 3/1218
                                                                358/1.15

* cited by examiner

*Primary Examiner* — Dov Popovici
(74) *Attorney, Agent, or Firm* — Canon U.S.A., Inc. IP Division

(57) ABSTRACT

An apparatus and method for a printing system is provided which determines whether image data input by execution of an input job is a blank and, in a case where the image data is determined to be a blank, the printing system records information indicating the determination of a blank as history information of the input job. Thus, in a case where image data input by execution of an input job is not output by execution of an output job, the user is able to easily confirm the cause of the output failure of the input image data.

15 Claims, 9 Drawing Sheets

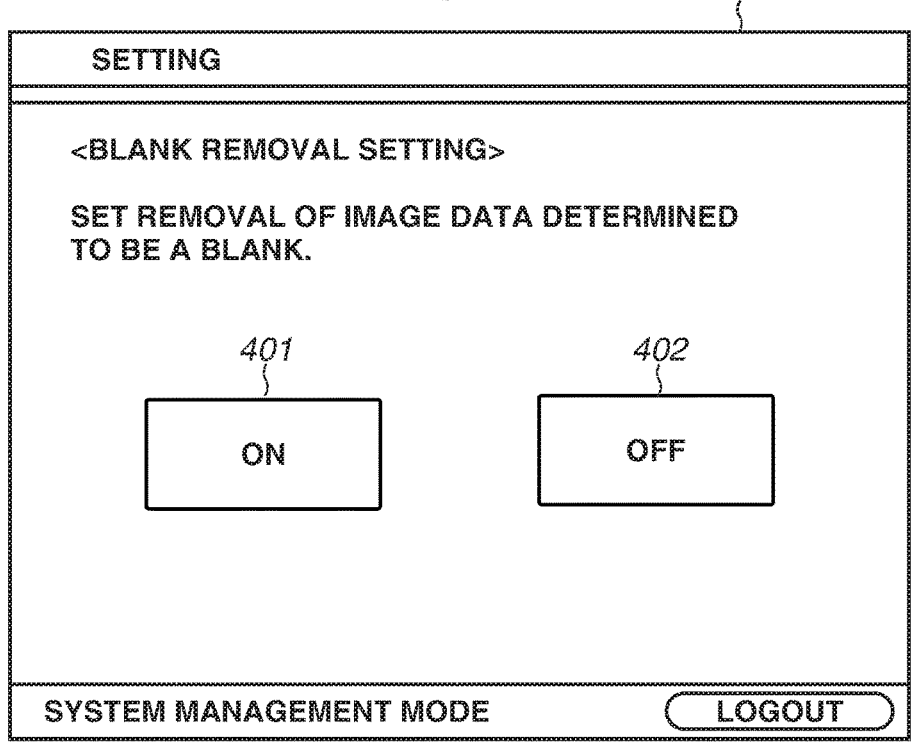
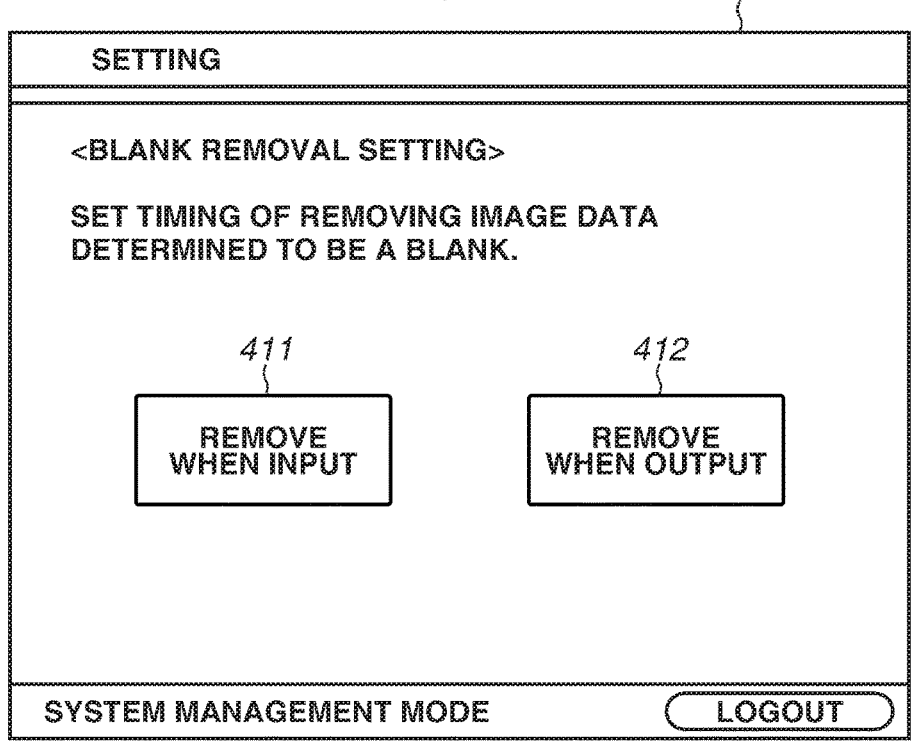

FIG.5A

| | JOB INFORMATION LOG (INPUT JOB) ~500 |
|---|---|
| 501 — JOB TYPE | SCAN |
| 502 — USER ID | 248921 |
| 503 — SECTION ID | 1038 |
| 504 — JOB START TIME | 19:03 MARCH 3, 2014 |
| 505 — JOB END TIME | 19:05 MARCH 3, 2014 |
| 506 — JOB EXECUTION RESULT | OK |
| 507 — NUMBER OF PAGES | 3 |
| 508 — COMMUNICATION PROTOCOL | — |
| 509 — TRANSMISSION (RECEPTION) DESTINATION ADDRESS/NUMBER | — |
| 510 — DOCUMENT ID | d87cf859 |
| 511 — OUTPUT SUPPRESSION PAGE | — |

FIG.5B

| | JOB INFORMATION LOG (OUTPUT JOB) ~520 |
|---|---|
| 501 — JOB TYPE | SEND |
| 502 — USER ID | 248921 |
| 503 — SECTION ID | 1038 |
| 504 — JOB START TIME | 19:03 MARCH 3, 2014 |
| 505 — JOB END TIME | 19:05 MARCH 3, 2014 |
| 506 — JOB EXECUTION RESULT | OK |
| 507 — NUMBER OF PAGES | 2 |
| 508 — COMMUNICATION PROTOCOL | G3 FAX |
| 509 — TRANSMISSION (RECEPTION) DESTINATION ADDRESS/NUMBER | 01-2345-6789 |
| 510 — DOCUMENT ID | d87cf859 |
| 511 — OUTPUT SUPPRESSION PAGE | 2 |

FIG.6

| | IMAGE INFORMATION LOG (1ST PAGE) | IMAGE INFORMATION LOG (2ND PAGE) | ... | IMAGE INFORMATION LOG (N-TH PAGE) |
|---|---|---|---|---|
| 601 — DOCUMENT ID | d87cf859 | d87cf859 | ... | d87cf859 |
| 602 — PAGE NUMBER | 1 | 2 | ... | N |
| 603 — IMAGE FORMAT | JPEG | JPEG | ... | JPEG |
| 604 — RESOLUTION | 300 × 300 | 300 × 300 | ... | 300 × 300 |
| 605 — IMAGE SIZE | 3508 × 2480 | 3508 × 2480 | ... | 3508 × 2480 |
| 606 — BLANK DETERMINATION FLAG | FALSE | TRUE | ... | FALSE |
| 607 — FILE PATH | /log/d87cf859/0001.jpg | /log/d87cf859/0002.jpg | ... | /log/d87cf859/00NN.jpg |

600

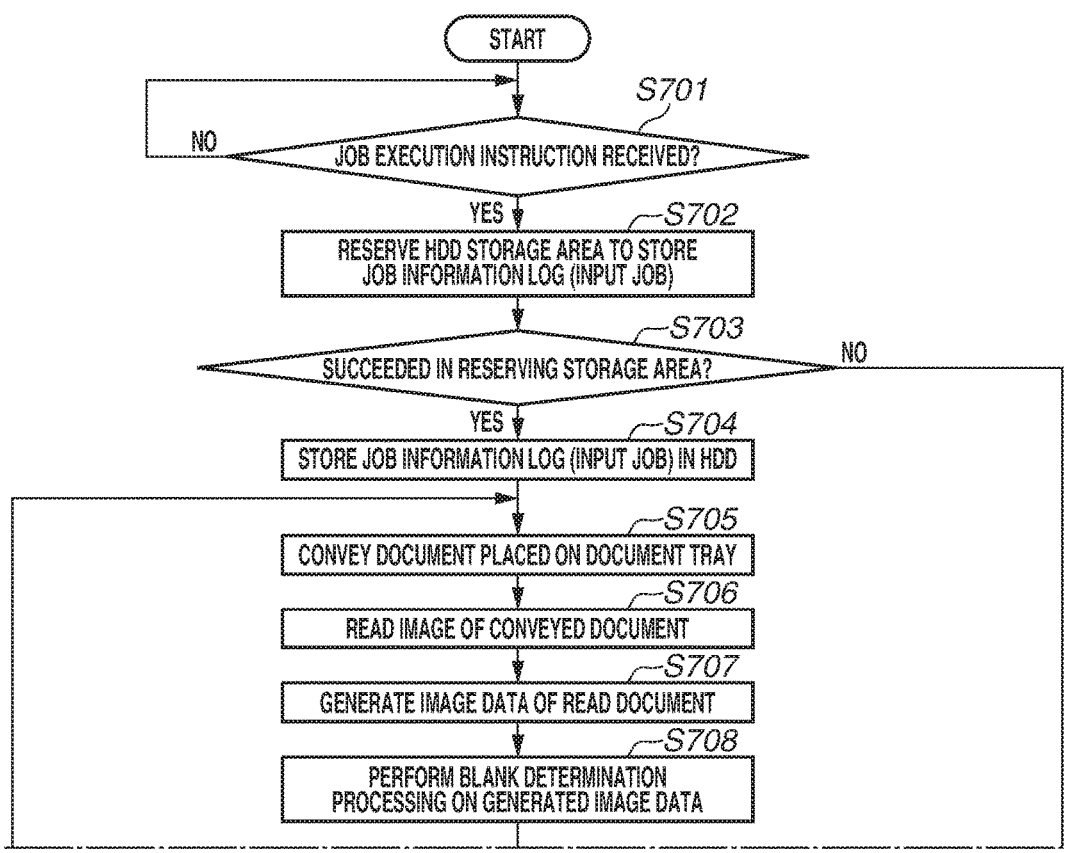

IMAGE PROCESSING APPARATUS, METHOD FOR CONTROLLING THE SAME, AND STORAGE MEDIUM

CROSS-REFERENCE TO RELATED APPLICATIONS

This application is a continuation application of U.S. patent application Ser. No. 14/701,303 filed on Apr. 30, 2015, now issued as U.S. Pat. No. 9,519,193, which claims the benefit of Japanese Patent Application No. 2014-095129 filed May 2, 2014, all of which are hereby incorporated by reference herein in their entirety.

BACKGROUND OF THE INVENTION

Field of the Invention

The present invention relates to an image processing apparatus for executing a job and storing history information of the executed job, a method for controlling the image processing apparatus, and a storage medium.

Description of the Related Art

An image processing apparatus is provided with a function for reading a document image to generate image data and storing the generated image data in a hard disk drive (HDD). The image processing apparatus is also provided with a function for reading image data stored in the HDD, printing an image on a sheet based on the image data, and transmitting the image data to an external apparatus. Thus, the image processing apparatus is capable of executing a job for inputting image data (hereinafter referred to as an input job) and a job for outputting image data (hereinafter referred to as an output job).

On the other hand, there is a server for storing image data as history information of an input job. Japanese Patent Application Laid-Open No. 2006-330939 discusses a technique in which history information of an output job for outputting image data input is stored by the server as information for referring to image data stored as history information of the input job without storing the image data.

Image data input by the execution of an input job is not necessarily output by execution of an output job. For example, in a case where a page of input image data is determined to be a blank, the image data of the blank is removed at the time of output and only image data of non-blank pages is output. Therefore, image data input by the execution of an input job may not be output by the execution of an output job.

Meanwhile, as history information of an output job, the server stores information for referring to image data stored as history information of an input job without storing the image data. Therefore, in a case where image data input by the execution of an input job is not output by the execution of an output job, a user is not able to easily confirm the cause of the failure.

SUMMARY OF THE INVENTION

According to an aspect of the present invention, an image processing apparatus includes a holding unit configured to hold image data, an executing unit configured to execute a first job for inputting image data and holding the input image data in the holding unit, and a second job for not outputting the image data input by execution of the first job, in a case where the input image data is a blank, and for outputting the image data input by the execution of the first job, in a case where the input image data is not a blank, a storing unit configured to store history information of a job executed by the executing unit on a job basis, and a control unit configured to, according to the execution of the first job by the executing unit, store the image data held in the holding unit by the execution of the first job together with information indicating whether the image data is a blank in the storing unit as history information of the first job, and, according to execution of the second job by the executing unit, not to store image data output by the execution of the second job in the storing unit as history information of the second job, and to store information for referring to image data held in the holding unit by the execution of the first job corresponding to the second job in the storing unit as history information of the second job.

Further features of the present invention will become apparent from the following description of exemplary embodiments (with reference to the attached drawings).

BRIEF DESCRIPTION OF THE DRAWINGS

FIGS. 4A and 4B are diagrams each illustrating a screen according to the first exemplary embodiment.

FIGS. 5A and 5B are diagrams each illustrating an example of table according to the first exemplary embodiment.

FIG. 6 is a diagram illustrating an example of table according to the first exemplary embodiment.

FIG. 7 is a diagram including the flowcharts of FIGS. 7A and 7B. FIGS. 7A and 7B are flowcharts illustrating an example of control according to the first exemplary embodiment.

DESCRIPTION OF THE EMBODIMENTS

An exemplary embodiment of the present invention will be described in detail below with reference to the accompanying drawings. The following exemplary embodiment does not limit the present invention within the ambit of the appended claims. Not all of the combinations of the features described in the present exemplary embodiment are indispensable to the solutions for the present invention.

Figure 1:
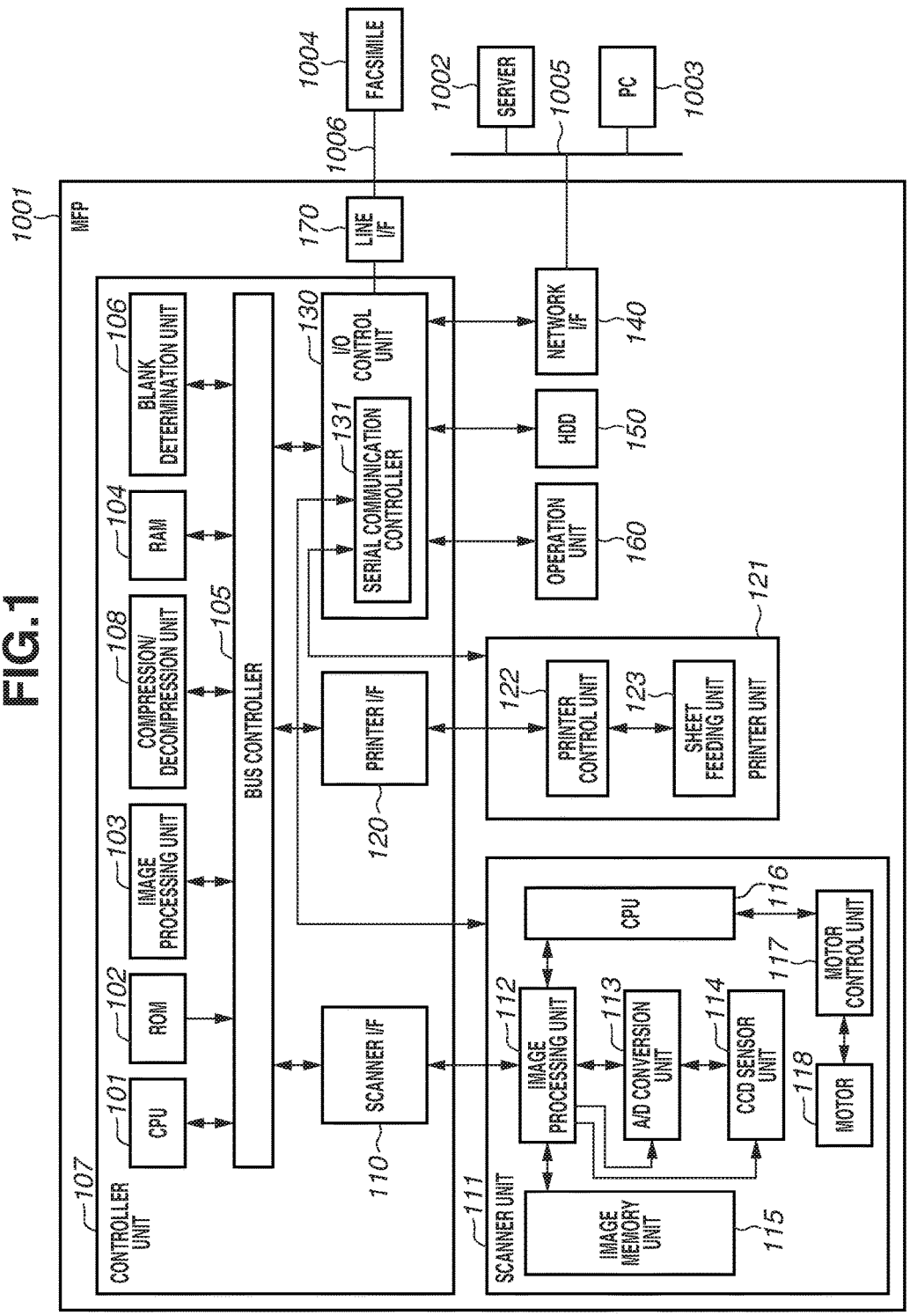
FIG. 1 is a block diagram illustrating a functional configuration of a multi-functional peripheral (MFP) according to an exemplary embodiment.

A printing system according to a first exemplary embodiment of the present invention will be described below with reference to FIG. 1.

The printing system according to the first exemplary embodiment stores image data as history information of a job for inputting image data (hereinafter referred to as an input job), such as a scanning job. As history information of a job for reading image data stored in a HDD and outputting the image data (hereinafter referred to as an output job), the printing system stores information for referring to the image data stored as history information of an input job without storing the image data.

For example, the printing system determines whether image data input by execution of an input job is a blank and, in a case where the image data is determined to be a blank, the printing system records information indicating the determination of a blank as history information of the input job.

Thus, in a case where image data input by execution of an input job is not output by execution of an output job, the user is able to easily confirm the cause of the output failure of the input image data (for example, the output is suppressed because of a blank).

The printing system will be described in detail below.

The printing system according to the present exemplary embodiment includes a multi-functional peripheral (MFP) 1001 as an example of an image reading apparatus for reading a document image, a server 1002, a personal computer (PC) 1003, and a facsimile 1004 as external information processing apparatuses.

The MFP 1001 has an image reading function for reading a document to generate image data, and a print function (copy function) for printing an image on a sheet based on the generated image data. The MFP 1001 further has a print function (PC print function) for receiving a print job from an external apparatus, such as a PC 1003, and printing texts and images on a sheet based on data for which a print instruction has been received. The print function preferably performs printing in color or monochrome.

More specifically, the MFP 1001 serves not only as an image reading apparatus but also as a printing apparatus. Although, in the present exemplary embodiment, the MFP 1001 is described as an example of an image reading apparatus, the example may be a scanner capable of reading a document to generate image data and transmitting the generated image data to the PC 1003, as long as an image reading function is provided thereto. Instead of transmitting the generated image data to the PC 1003, the scanner may store the data in a detachable external memory, such as a universal serial bus (USB) memory.

The MFP 1001 is connected with the server 1002 and the PC 1003 via a local area network (LAN) 1005 to communicate with the server 1002 and the PC 1003.

The MFP 1001 may be connected with the server 1002 and the PC 1003 via a wide area network (WAN), such as the Internet. The MFP 1001 and the PC 1003 may be connected with each other via a USB cable, and the connection may be configured via wireless communication, such as Wireless Fidelity (Wi-Fi) and Bluetooth (registered trademark), to communicate with each other.

The MFP 1001 is connected with the facsimile 1004 via a public line 1006, such as a WAN, to perform facsimile (FAX) communication with the facsimile 1004.

The server 1002 uniquely manages a log file (job information log) for recording attributes of input and output jobs executed by the MFP 1001, and a document file (image information log) for recording image data and page attributes accompanying each page. The server 1002 receives the job information log and the image information log from the MFP 1001 via a network, such as the LAN 1005. The job information log will be described in detail below with reference to FIGS. 5A and 5B. The image information log will be described in detail below with reference to FIG. 6.

The PC 1003 inputs a print job to the MFP 1001 via a network, such as the LAN 1005. The MFP 1001 processes the print job input from the PC 1003 via a network, such as the LAN 1005. The PC 1003 generates image data by using application software, and transmits the generated image data to the MFP 1001. Although, in the present exemplary embodiment, the PC 1003 has been described above as an example of an external information processing apparatus, the example may be a mobile information terminal, such as a personal digital assistant (PDA) and a smart phone.

The MFP 1001 according to the present exemplary embodiment includes a controller unit (control unit) 107, a scanner unit 111, a printer unit 121, a network interface (I/F) 140, a HDD 150, an operation unit 160, and a line I/F 170 to be described below. These units are electrically connected to transmit and receive control commands and data with each other. The network I/F 140, an example of a communication unit, is an interface for transmitting and receiving image data to/from an external apparatus, such as the PC 1003. In addition to the PC 1003, examples of the external apparatus include a network connection apparatus, such as the server 1002, and an external exclusive apparatus.

The line I/F 170, an example of the communication unit, connects the controller unit 107 to the public line 1006. For example, the MFP 1001 performs FAX communication with an external apparatus, such as the facsimile 1004.

The controller unit 107 includes a plurality of function blocks, such as a central processing unit (CPU) 101, a read only memory (ROM) 102, an image processing unit 103, a random access memory (RAM) 104, a blank determination unit 106, a compression/decompression unit 108, a scanner I/F 110, a printer I/F 120, and an input/output (I/O) control unit 130. These units are electrically connected with each other via the bus controller 105 to transmit and receive control commands and data with each other.

The CPU 101 controls processing and operations of various units included in the MFP 1001.

The ROM 102 is a read only memory, and includes programs pre-stored therein, such as a boot sequence and font information.

The RAM 104 is a readable and writable memory and stores image data transmitted from the scanner unit 111 or the network I/F 140, various programs, setting information, and the like. In the present exemplary embodiment, a dynamic random access memory (DRAM) is described as an example of the RAM 104.

The ROM 102 or the HDD 150 stores various control programs required for the CPU 101 to execute various processing of programs detailed in the flowcharts to be described below. The ROM 102 or the HDD 150 further stores a display control program for displaying various user interface (UI) screens on a display unit of the operation unit 160 to be described below. Various operations according to the present exemplary embodiment are implemented in such a manner that the CPU 101 reads a program stored in the ROM 102 or HDD 150, loads the program into the RAM 104, and executes the program.

The ROM 102 also stores a program required for the CPU 101 to perform operations for interpreting page description language (PDL) data received from an external apparatus via the network I/F 140, and rasterizing the data into raster image data (bitmap image data). Similarly, the ROM 102 also stores a program required for the CPU 101 to interpret a print job received from an external apparatus via the network I/F 140, and perform processing. These operations are processed by software.

The scanner I/F 110 connects the controller unit 107 to the scanner unit 111 which is an image reading apparatus. On the other hand, the printer I/F 120 connects the controller unit 107 to the printer unit 121 which is an image output apparatus. The controller unit 107 performs synchronous/asynchronous conversion and control via the scanner I/F 110 and the printer I/F 120.

The MFP 1001 includes a nonvolatile memory, such as the HDD 150, capable of storing a plurality of processing target jobs, inside thereof. The HDD 150 is capable of storing system software and image data converted into a red, green, and blue (RGB) signal by an image processing unit 112 to be described below. The HDD 150 is configured to be able to store a plurality of data, such as print data of a processing target job. The job information log and the image information log can be stored in a predetermined storage area of the HDD 150 for a job executed by the MFP 1001. Although, in the present exemplary embodiment, the HDD 150 is described as an example of a mass-storage nonvolatile storage device, the storage device may be a nonvolatile memory, such as a solid state drive (SSD).

The controller unit 107 stores (holds) in the HDD 150 processing target jobs input via various input units, such as the scanner unit 111 and the network I/F 140. Then, the controller unit 107 reads the job stored (held) in the HDD 150, and outputs the job to the printer unit 121 for printing. The controller unit 107 further performs control to transmit the job read from the HDD 150 to an external apparatus, such as the server 1002, via the network I/F 140. The controller unit 107 further performs control to transmit the job information log and the image information log read from the HDD 150 to an external apparatus, such as the server 1002, via the network I/F 140. Thus, the controller unit 107 performs various output processing on the processing target job stored in the HDD 150.

The scanner unit 111 includes an image processing unit 112, an analog-to-digital (A/D) conversion unit 113, a charge coupled device (CCD) sensor unit 114, an image memory unit 115, a CPU 116, a motor control unit 117, and a motor 118. The scanner unit 111 is electrically connected with the controller unit 107 via a serial communication controller 131 in the I/O control unit 130.

The motor 118 is driven to move an exposure unit 213 and a mirror unit 214 to be described below, in the scanner unit 111. Although, in the following descriptions, the controller unit 107 instructs the motor 118 via the motor control unit 117 to move the exposure unit 213 and the mirror unit 214 in the scanner unit 111, the configuration is not limited thereto. The CPU 116 of the scanner unit 111 may directly instruct the motor 118 to move the exposure unit 213 and the mirror unit 214 in the scanner unit 111.

An analog signal of image data of the document read by the CCD sensor unit 114 is converted into a digital signal by the A/D conversion unit 113. Then, the digital signal is converted into an RGB signal by the image processing unit 112. The RGB signal is temporarily stored in the RAM 104 via the scanner I/F 110 and the bus controller 105 in the controller unit 107. Then, the image data is stored in the HDD 150 via the I/O control unit 130 under the control of the CPU 101 of the controller unit 107.

In a case where printing of the image data stored in the HDD 150 is performed, the image data stored in the HDD 150 is temporarily stored in the RAM 104 under the control of the CPU 101 of the controller unit 107. The image data temporarily stored in the RAM 104 undergoes color space conversion, such as conversion from RGB to cyan, magenta, yellow, and black (CMYK) by the image processing unit 103, and then is transmitted to the printer unit 121 via the printer I/F 120. The printer unit 121 includes a printer control unit 122 for controlling communication with the controller unit 107. The printer unit 121 further includes a sheet feeding unit 123 having a plurality of sheet holding units (also referred to as sheet feeding stages) for storing sheets to be used for printing. The printer unit 121 is electrically connected with the controller unit 107 via the serial communication controller 131 in the I/O control unit 130.

The printer unit 121 performs print processing on a printing target job stored in the HDD 150. The controller unit 107 instructs the printer unit 121 via the printer control unit 122 to print image data. Then, based on the image data, the printer unit 121 forms (prints) an image, by using a toner, on a sheet conveyed from the sheet feeding unit 123, and then transfers and fixes the image data.

On the other hand, when the MFP 1001 transmits the image data stored in the HDD 150 to the PC 1003 as an external apparatus, the image data is transmitted to the PC 1003 via the network I/F 140.

The blank determination unit 106 is able to determine whether the image data processed by the image processing unit 112 is blank data (hereafter referred to as blank determination processing). For example, according to a threshold value calculated from a histogram of image data transmitted to the blank determination unit 106, the blank determination unit 106 performs binary processing on the image data. Then, in a case where the ratio of black pixels is a predetermined value or below as a result of analysis by the binary processing, the blank determination unit 106 determines that the relevant image data is a blank.

Although, in the present exemplary embodiment, the blank determination unit 106 is described to perform the blank determination processing on the image data processed by the image processing unit 112, the configuration is not limited thereto. The blank determination unit 106 may perform the blank determination processing on processing target image data input via various input units, such as the scanner unit 111 and the network I/F 140.

The compression/decompression unit 108 is provided with image processing blocks in which the image data stored in the RAM 104 and the HDD 150 can be compressed and decompressed based on various compression methods such as Joint Bi-level Image Experts Group (JBIG) and Joint Photographic Experts Group (JPEG), and then stored again in the RAM 104. The image data compressed by the compression/decompression unit 108 can be transmitted to an external apparatus via the network I/F 140.

The controller unit 107 can receive image data from an external apparatus, such as the PC 1003, via the network I/F 140. Then, at a timing of when the image data received via the network I/F 140 is stored in the HDD 150, the image data is compressed by the compression/decompression unit 108. On the other hand, at a time when an image is printed on a sheet based on image data stored in the HDD 150, the image data is decompressed by the compression/decompression unit 108.

The MFP 1001 is provided with the operation unit 160 having a display unit corresponding to an example of a user interface unit. The operation unit 160 of the MFP 1001 according to the present exemplary embodiment has a display unit and hardware keys (not illustrated). The display unit is composed of a liquid crystal display (LCD) and a touch panel sheet formed of transparent electrodes (capacitance type is also applicable) provided on the LCD. Operation screens and statuses of the MFP 1001 are displayed on the LCD. The operation unit 160 has a function for receiving various settings from the user via the operation screens and hardware keys, and a function for providing the user with information.

Figure 2:
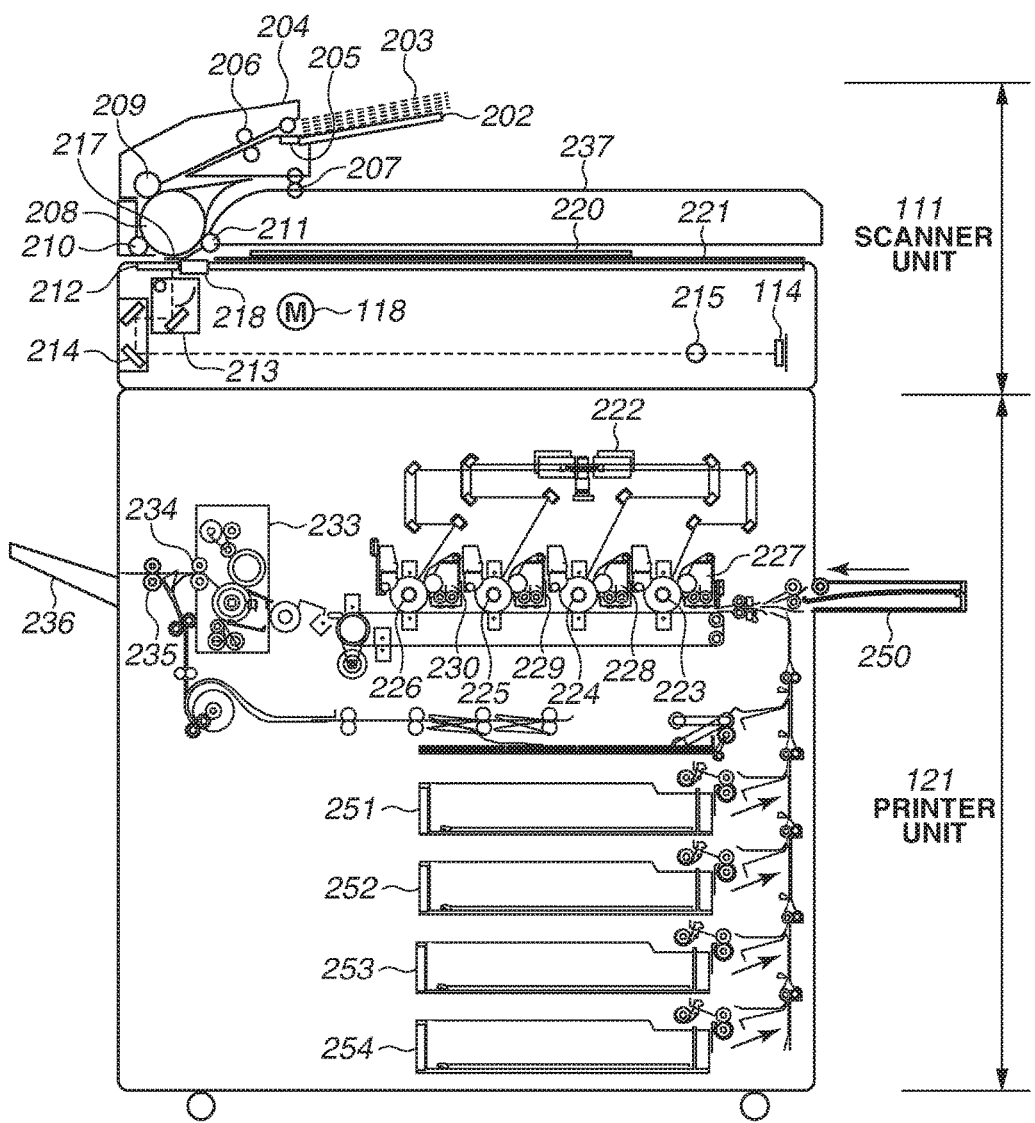
FIG. 2 is a sectional view illustrating a configuration of the MFP according to the present exemplary embodiment.

A sectional view illustrating the scanner unit 111 and the printer unit 121 illustrated in FIG. 1 will be described below with reference to FIG. 2. The following describes a case where the scanner unit 111 performs an operation for reading an image of a document sheet placed on a document tray of an auto document feeder (ADF).

Document sheets 203 placed on a document tray 202 of the ADF are conveyed one by one by a document feeding roller pair 204 and a separation pad 205. After a document sheet 203 has been conveyed into the apparatus by an intermediate roller pair 206, it is further conveyed by a large roller 208 and a roller 210 and at the same time further conveyed by the large roller 208 and a roller 209. Then, the document sheet 203 passes between a document guide plate 217 and a document glass 212 while being in contact with the document glass 212. After the document sheet 203 has passed through a jumping plate 218, the document sheet 203 is further conveyed by the large roller 208 and a roller 211, and then discharged onto a document output tray 237 by a document discharge roller pair 207.

While the document sheet 203 is passing through the document glass 212, the side in contact with the document glass 212 is exposed to light from the exposure unit 213, and an image of the document sheet 203 is read in the main and sub scanning directions. Reflected light from the document sheet 203 acquired as a result of exposure is transmitted to the mirror unit 214 via a plurality of mirrors. The transmitted reflected light passes through a lens 215 to be condensed, and then is converted into an electrical signal by the CCD sensor unit 114. Image data output from the CCD sensor unit 114 undergoes the above-described predetermined processing, and then is transmitted to the controller unit 107.

Although, in the present exemplary embodiment, an optical system included in the scanner unit 111 is described as a reducing optical system for condensing the reflected light from the document sheet 203 onto the CCD sensor, the configuration is not limited thereto. The optical system included in the scanner unit 111 may be an equal magnification optical system for condensing the reflected light from the document sheet 203 onto a contact image sensor (CIS).

Although, during the document image reading operation performed by the scanner unit 111, the optical system is fixed at a position, and a document image is read while the document sheet 203 is being conveyed by the ADF, the configuration is not limited thereto. Alternatively, a document sheet 203 may be placed on a platen glass 221 (a document positioning plate 220) and fixed at a position, and the optical system may read a document image while the optical system is being moved.

The following describes an operation for outputting an image onto a sheet based on the image data transmitted to the printer unit 121. The image data transmitted to the printer unit 121 is converted into laser light according to the image data by a laser unit 222. Then, photosensitive drums 223 to 226 are irradiated with this laser light to form corresponding latent images thereon according to the laser light. A development agent is applied to portions of the latent images on the photosensitive drum 223 to 226 by development units 227 to 230, respectively. A color machine includes four photosensitive drums and four development units for cyan, yellow, magenta, and black.

The printer unit 121 includes sheet feeding cassettes 251 to 254 having a drawer-like shape and a manual sheet feeding tray 250, as sheet holding units provided on the sheet feeding unit 123. Each of the sheet feeding cassettes 251 to 254 is able to store a plurality of sheets. The manual sheet feeding tray 250 is able to store a plurality of sheets.

The printer unit 121 may be provided with a plurality of sheet feeding cassettes and manual sheet feeding trays, and needs to be provided with at least any one of a sheet feeding cassette and a manual sheet feeding tray. The following descriptions based on the MFP 1001 according to the present exemplary embodiment have four sheet feeding cassettes and a single manual sheet feeding tray.

The printer unit 121 feeds a sheet from any one of the sheet feeding cassettes 251 to 254 and the manual sheet feeding tray 250. Then, development agent adhered to the photosensitive drums 223 to 226 is transferred onto a fed sheet. The sheet is then conveyed to a fixing unit 233, and the development agent is fixed onto the sheet by heat and pressure. After passing through the fixing unit 233, the sheet is discharged onto a discharge tray 236 by conveyance rollers 234 and 235. In a case where the MFP 1001 is not provided with the discharge tray 236 as a discharge unit, the sheet having passed through the fixing unit 233 may be discharged onto an inside position as a discharge unit.

Although the MFP 1001 according to the present exemplary embodiment is described as a color machine having four photosensitive drums and four development units, the configuration thereof is not limited thereto. Even in a case where the MFP 1001 is a monochrome machine having one photosensitive drum and one development unit, the present invention is similarly applicable to the MFP 1001. Although the MFP 1001 according to the present exemplary embodiment is described to print an image on a sheet through the electrophotographic process, the configuration is not limited thereto. As long as an image is printed on a sheet, the MFP 1001 may employ the ink-jet process or other processes.

Figure 3:
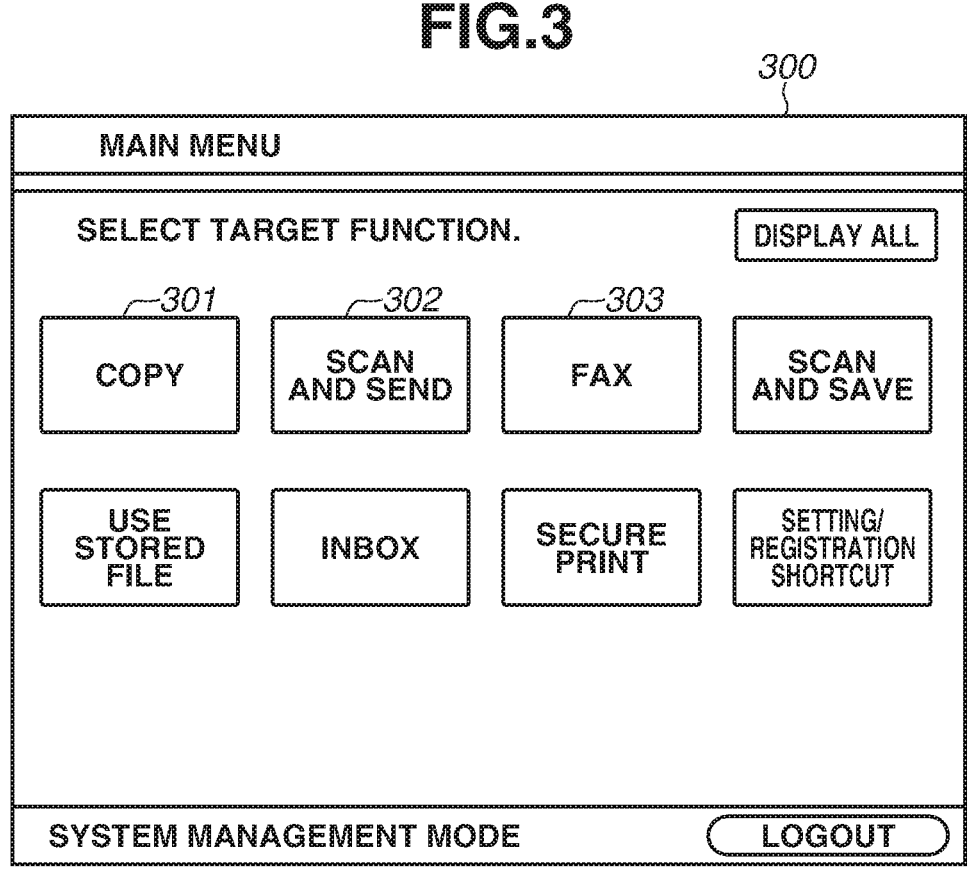
FIG. 3 is a diagram illustrating a screen according to a first exemplary embodiment.

FIG. 3 illustrates an example of a main screen 300 displayed on the operation unit 160 of the MFP 1001 according to the first exemplary embodiment. The main screen 300 displays selection buttons for calling various functions, such as a copy function 301, a scan and send function 302, and a FAX function 303. When the user presses a desired selection button, a screen for using the relevant function is displayed. For example, when the user selects the FAX function 303, an execution screen (not illustrated) for using the FAX function 303 is displayed on the operation unit 160.

When the copy function 301, the scan and send function 302, or the FAX function 303 is used, the user is able to set the removal of image data determined to be a blank by the blank determination unit 106.

For example, a setting screen 400 illustrated in FIG. 4A displayed on the operation unit 160 enables the user to arbitrarily specify whether to remove image data determined to be a blank. The setting screen 400 illustrated in FIG. 4A is called when the user presses a setting button (not illustrated) displayed on the main screen 300 illustrated in FIG. 3.

For example, in a case where image data determined to be a blank is removed and only image data determined to be not a blank is output, the user only needs to press an ON button 401 on the setting screen 400 illustrated in FIG. 4A. Further, for example, in a case where all pieces of image data are output without removing image data determined to be a blank, the user only needs to press an OFF button 402 on the setting screen 400 illustrated in FIG. 4A.

When the user presses the ON button 401 on the setting screen 400 illustrated in FIG. 4A, a setting screen 410 illustrated in FIG. 4B is further displayed on the operation unit 160. Alternatively, the setting screen 410 illustrated in FIG. 4B may be called in response to user's pressing of a setting key (not illustrated) displayed on the main screen 300 illustrated in FIG. 3.

The setting screen 410 illustrated in FIG. 4B enables the user to arbitrarily set the timing of removing image data determined to be a blank. For example, in a case where image data determined to be a blank is avoided from being output by not storing the image data determined to be a blank in the HDD 150, the user only needs to press a "Remove When Input" button 411. On the other hand, in a case where image data determined to be a blank is stored in the HDD 150 and is avoided from being output, the user only needs to press a "Remove When Output" button 412.

The job information log to be stored in the HDD 150 according to the execution of an input job or an output job will be described in detail below. The following descriptions will be made on the premise that a table 500 illustrated in FIG. 5A and a table 520 illustrated in FIG. 5B are both stored in the HDD 150. The table 500 indicates the job information log for an input job and the table 520 indicates the job information log for an output job. A user's operation is received on the operation unit 160, and a confirmation screen (not illustrated) is called, whereby the user is able to confirm values recorded in the table 500 illustrated in FIG. 5A and the table 520 illustrated in FIG. 5B.

The job information log is recorded on a job basis. For example, a copy job includes a "scanning job" (input job) for reading a document image to generate image data, and a "print job" (output job) for printing an image on a sheet based on the generated image data. Further, for example, a FAX transmission job includes a "scanning job" (input job) for reading a document image to generate image data, and a "transmission job" (output job) for transmitting the generated image data to an external apparatus.

Therefore, in a case where the copy job and the FAX transmission job are executed, the job information log for the input job and the job information log for the output job are stored in the HDD 150.

Examples of attributes recorded in the job information log include a job type 501, a user identifier (ID) 502, a section ID 503, a job start time 504, a job end time 505, a job execution result 506, a number of pages 507, a document ID 510, and an output suppression page 511. Attributes further include, for example, a communication protocol 508 and a transmission (reception) destination address/number 509. Each attribute recorded in the job information log will be described in detail below.

The job type 501 is an attribute for indicating the type of a job, such as a copy job, a PDL print job, a scan job, a transmission job, and a reception job. For example, in a case where a copy job is executed, "Copy" is recorded as an attribute value of the job type 501. Further, for example, in a case where a scanning job is executed, "Scan" is recorded as an attribute value of the job type 501.

The user ID 502 is an attribute for indicating an ID which identifies a user who has executed the job. The section ID 503 is an attribute for indicating an ID which identifies a section to which the user who has executed the job belongs. These IDs are pieces of information identified, for example, by reading user information pre-recorded in an integrated circuit (IC) card, for the purpose of user authentication.

The job start time 504 and the job end time 505 are attributes for indicating the start time of a job for which an execution instruction is received and the end time of the job, respectively.

The job execution result 506 is an attribute for indicating whether a job for which an execution instruction has been received normally ends, abnormally ends because of an error, or is canceled. For example, in a case where a job normally ends, "OK" is recorded as an attribute value of the job execution result 506. Further, for example, in a case where a job abnormally ends because of an error, "NG" is recorded as an attribute value of the job execution result 506.

The number of pages 507 is an attribute for indicating the number of pages having been normally processed by execution of a job for which an execution instruction has been received. For example, in a case where document images for 3 pages are read by execution of a job, "3" is recorded as an attribute value of the number of pages 507 in a job information log for an input job. On the other hand, in a case where image data for 2 pages is transmitted by execution of a job, "2" is recorded as an attribute value of the number of pages 507 in a job information log for an output job.

The document ID 510 is an attribute for indicating an ID which uniquely identifies a document output and input by execution of a job as one document. For example, to uniquely identify a document output and input by execution of a FAX transmission job as one document, an ID having the same value is recorded as a document ID in the job information log for an input job and also as a document ID in the job information log for an output job.

The communication protocol 508 is an attribute for indicating an address and a number for a communication partner according to the communication protocol. Examples of an attribute value of the communication protocol 508 include G3FAX, I-FAX, and file transfer protocol (FTP). The attribute value of the communication protocol 508 is recorded only in a case where a type of a job for which an execution instruction has been received is a transmission job or a reception job. For example, in a case where a FAX transmission job is executed, "G3FAX" is recorded as an attribute value of the communication protocol 508. On the other hand, in a case where a copy job is executed, the attribute value of the communication protocol 508 is not recorded.

The transmission (reception) destination address/number 509 is an attribute for indicating the address and the number for the communication partner according to the communication protocol. The attribute value of the transmission (reception) destination address/number 509 is recorded only in a case where a type of the job for which an execution instruction has been received is a transmission job or a reception job. For example, in a case where a FAX transmission job is executed, the FAX number is recorded as an attribute value of the transmission (reception) destination address/number 509. On the other hand, in a case where a copy job is executed, the attribute value of the transmission (reception) destination address/number 509 is not recorded.

The output suppression page 511 is an attribute for indicating a list of output suppression page numbers out of the document identified by the document ID 510. For example, in a case where the removal of image data determined to be a blank is set ON (remove image data determined to be a blank and output only image data determined to be not a blank) in the setting screen 400 illustrated in FIG. 4A, the page number of image data which has not been output is recorded. On the other hand, in a case where the removal of image data determined to be a blank is set OFF in the setting screen 400 illustrated in FIG. 4A, data output is not suppressed and therefore the page number of image data which has not been output is not recorded.

For example, the removal of image data determined to be a blank is assumed to be set ON in the setting screen 400 illustrated in FIG. 4A. Also, as a result of executing a FAX transmission job and reading document images for 3 pages, the second page of the document is assumed to be determined to be a blank. In such a case, since image data of the second page of the document is not transmitted (output), "2" is recorded as an attribute value of the output suppression page 511 in the job information log for the output job. The attribute value of the output suppression page 511 in the job information log for an input job is not recorded.

Although, in the above-described case, the page number of image data which has not been output is recorded as the output suppression page 511 in the job information log for an output job, the configuration is not limited thereto. For example, the page number of image data determined to be a blank may be further recorded in the job information log for an output job.

The image information log stored in the HDD 150 after execution of an input job will be described in detail below with reference to a table 600 illustrated in FIG. 6. A user's operation is received on the operation unit 160 and a confirmation screen (not illustrated) is called, whereby the user is able to confirm values recorded in the table 600 illustrated in FIG. 6.

The image information log records attribute information (an image type, a resolution, an image size, etc.) of image data input by execution of an input job, on a page basis. In a case where the image information log is stored in the HDD 150, log image data corresponding to image data input by execution of an input job is stored in the HDD 150, together with the image information log. The log image data is generated by converting the image data input by execution of an input job into a predetermined image format, a predetermined resolution, or a predetermined size as required.

For example, in a case where document images for 3 pages are read by execution of a scanning job, the image information log for 3 pages and log image data for the 3 pages are stored in the HDD 150.

In a case where an output job is executed, the image information log for an output job is not recorded. This is because the image information log for an input job can be referred to by using the document ID 510 in the job information log for an output job as reference information. Therefore, it is not necessary to store in the HDD 150 the log image data corresponding to image data output by execution of an output job, and it is only necessary to refer to the log image data corresponding to image data input by execution of an input job.

Examples of attributes recorded in the image information log include a document ID 601, a page number 602, an image format 603, a resolution 604, an image size 605, a blank determination flag 606, and a file path 607. Each attribute recorded in the image information log will be described in detail below.

The document ID 601 is an attribute for indicating an ID which uniquely identifies a document input by execution of an input job as one document. The document ID 601 corresponds to the above-described document ID 510 in the job information log.

The page number 602 is an attribute for indicating the page number of an identical document input by execution of an input job. For example, "1" is recorded as an attribute value of the page number 602 for image data corresponding to the first page of the document. Similarly, "N" is recorded as an attribute value of the page number 602 for image data corresponding to the N-th page of the document.

The image format 603 is an attribute for indicating the format of image data input by execution of an input job. The attribute value of the image format 603 recorded in the image information log is input from a setting screen (not illustrated) by the user in the execution of an input job. Examples of attribute values of the image format 603 include JPEG, Portable Network Graphics (PNG), Tagged Image File Format (TIFF), and JBIG.

The resolution 604 is an attribute for indicating the resolution of image data input by execution of an input job. The attribute value of the resolution 604 recorded in the image information log is input by the user from a setting screen (not illustrated) in the execution of an input job. For example, in a case where the attribute value of the resolution 604 is "300×300", the attribute value indicates a main scanning resolution of 300 dots per inch (dpi) and a sub scanning resolution of 300 dpi.

The image size 605 is an attribute for indicating the number of pixels of main scanning x sub scanning (width× height) of image data input by execution of an input job. The attribute value of the image size 605 recorded in the image information log is input by the user from a setting screen (not illustrated) in the execution of an input job. For example, in a case where the attribute value of the image size 605 is "3508×2480", the attribute value indicates that the image has a "width×height" of 3508 pixels (main scanning)×2480 pixels (sub scanning).

The blank determination flag 606 is an attribute for indicating whether the image data input by execution of an input job is determined to be a blank. Whether image data is a blank is determined by the above-described blank determination unit 106. In a case where the image data is determined to be a blank, "TRUE" is recorded as an attribute value of the blank determination flag 606. On the other hand, in a case where the image data is determined to be not a blank, "FALSE" is recorded as an attribute value of the blank determination flag 606.

The file path 607 is an attribute for indicating the file path of image data for a log stored in the HDD 150.

As described above, the printing system according to the exemplary embodiment of the present invention includes the MFP 1001, the server 1002, the PC 1003, and the facsimile 1004. The MFP 1001 stores, in the HDD 150, a job information log corresponding to an input job, an image information log for an input job, and log image data corresponding to image data input by an input job, according to the execution of an input job. On the other hand, the MFP 1001 stores, in the HDD 150, the job information log for an output job and does not store, in the HDD 150, the image information log for an output job and the log image data corresponding to image data output by the output job, according to the execution of an output job.

For example, the blank determination unit 106 determines whether image data input by the execution of an input job is a blank. In a case where the image data is determined to be a blank, a flag indicating that image data is determined to be a blank is recorded in the history information of the input job. Thus, in a case where image data input by execution of an input job has not been output by execution of an output job, the user is able to easily confirm the cause of the output failure of the input image data (for example, output is suppressed because of a blank).

Figure 7B:
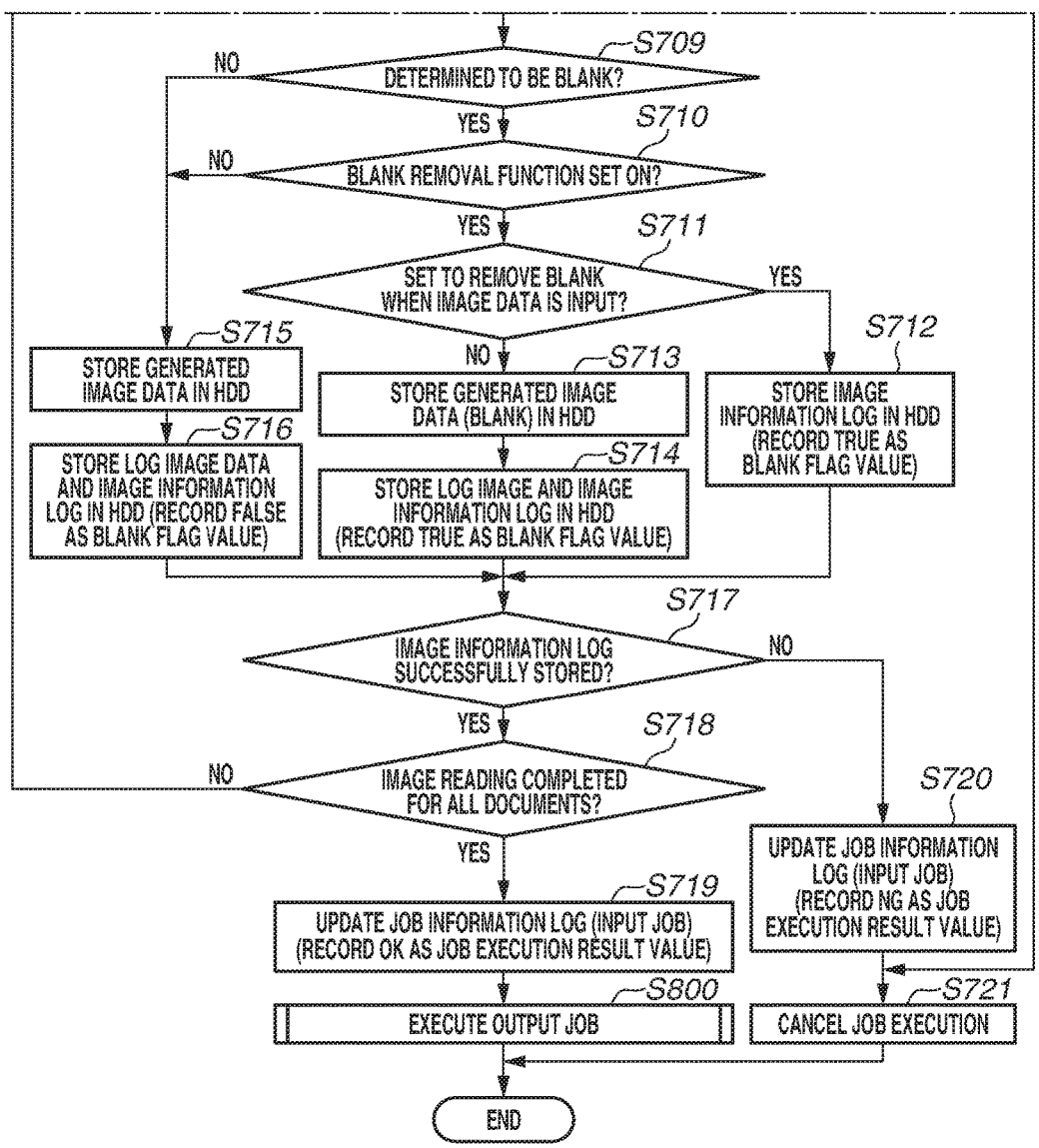

A series of processes performed by the MFP 1001 according to the first exemplary embodiment executes an input job and stores history information of the executed input job will be described in detail below with reference to the flowchart illustrated in FIG. 7. This processing is implemented by the CPU 101 of the controller unit 107 which executes a program read from the ROM 102 or the HDD 150 and is loaded into the RAM 104. The processing illustrated in FIG. 7 is started, for example, when an execution screen (not illustrated) for using the Fax function 303 is displayed in the operation unit 160, and the user inputs an image format, a resolution, an image size, and the like for scanning, and instructs to execute a job.

In step S701, the CPU 101 determines whether an execution instruction for a job (for example, a FAX transmission job and a copy job) has been received. In a case where relevant execution instruction is determined to have been received (YES in step S701), the processing proceeds to step S702. On the other hand, in a case where the relevant execution instruction is determined to have not been received (NO in step S701), the CPU 101 repeats the processing in step S701.

In step S702, the CPU 101 reserves a storage area in the HDD 150 to store the job information log for an input job, and the processing proceeds to step S703.

In step S703, the CPU 101 determines whether a storage area of the HDD 150 has successfully been reserved to store the job information log for the input job. In a case where relevant storage area is determined to have successfully been reserved (YES in step S703), the processing proceeds to step S704. On the other hand, in a case where the relevant storage area is determined to have not successfully been reserved (NO in step S703), the processing proceeds to step S721.

In step S704, the CPU 101 stores the job information log (for example, the job type 501, the user ID 502, the section ID 503, and the job start time 504) for the input job in the HDD 150, and the processing proceeds to step S705.

In step S705, the CPU 101 conveys the document sheet 203 placed on the document tray 202, and the processing proceeds to step S706.

In step S706, the CPU 101 reads an image of the document sheet 203 conveyed in step S705 using the scanner unit 111, and the processing proceeds to step S707.

In step S707, the CPU 101 generates image data of the document sheet 203 read in step S706, and the processing proceeds to step S708.

In step S708, the CPU 101 performs blank determination processing by the blank determination unit 106 on the image data generated in step S707, and the processing proceeds to step S709.

In step S709, as a result of the blank determination processing in step S708, the CPU 101 determines whether the image data generated in step S707 is a blank. In a case where the image data is determined to be a blank (YES in step S709), the processing proceeds to step S710. On the other hand, in a case where the image data is determined to be not a blank (NO in step S709), the processing proceeds to step S715.

In step S710, the CPU 101 determines whether the blank removal function is set ON using the setting screen 400 illustrated in FIG. 4A. In a case where the blank removal function is determined to be set ON (YES in step S710), the processing proceeds to step S711. On the other hand, in a case where the blank removal function is determined to be not set ON (NO in step S710), the processing proceeds to step S715.

In step S711, the CPU 101 determines whether blank removal in inputting of image data is set using the setting screen 410 illustrated in FIG. 4B. In a case where the blank removal is determined to be set (YES in step S711), the processing proceeds to step S712. On the other hand, in a case where the blank removal is determined to be not set (NO in step S711), the processing proceeds to step S713.

In step S712, the CPU 101 stores, in the HDD 150, the image information log corresponding to the document page of the image read in step S706, and the processing proceeds to step S717. In step S712, the CPU 101 records "TRUE" as a value of the blank determination flag of the image information log.

In step S713, the CPU 101 stores the image data (blank) generated in step S707 in the HDD 150, and the processing proceeds to step S714.

In step S714, the CPU 101 stores, in the HDD 150, the log image data corresponding to the image data (blank) generated in step S707 and the image information log corresponding to the document page of the image read in step S706, and the processing proceeds to step S717. In step S714, the CPU 101 records "TRUE" as a value of the blank determination flag in the image information log.

In step S715, the CPU 101 stores in the HDD 150 the image data generated in step S707, and the processing proceeds to step S716.

In step S716, the CPU 101 stores, in the HDD 150, the log image data corresponding to the image data generated in step S707 and the image information log corresponding to the document page of the image read in step S706, and the processing proceeds to step S717. In step S716, the CPU 101 records "FALSE" as a value of the blank determination flag in the image information log.

In step S717, the CPU 101 determines whether the image information log has successfully been stored in the HDD 150. In a case where image information log has successfully been stored (YES in step S717), the processing proceeds to step S718. On the other hand, in a case where the image information log has not successfully been stored (NO in step S717), the processing proceeds to step S720.

In step S718, the CPU 101 determines whether image reading is completed for all of the document sheets 203 placed on the document tray 202. In a case where image reading is determined to be completed (YES in step S718), the processing proceeds to step S719. On the other hand, in a case where image reading is determined to be not completed (NO in step S718), the processing returns to step S705.

In step S719, the CPU 101 updates the job information log (for example, the job end time 505, the job execution result 506, the number of pages 507, and the document ID 510) for the input job, and the processing proceeds to step S800. In step S719, the CPU 101 records "OK" as a value of the job execution result 506 in the job information log for the input job.

In step S800, the CPU 101 performs processing related to an output job (for example, a FAX transmission job). The processing in step S800 will be described in detail below with reference to the flowchart illustrated in FIG. 8. Upon completion of the processing in step S800, the CPU 101 completes a series of processing illustrated in FIG. 7.

In step S720, the CPU 101 updates the job information log (for example, the job end time 505, the job execution result 506, the number of pages 507, and the document ID 510) for the input job, and the processing proceeds to step S721. In step S720, the CPU 101 records "NG" as a value of the job execution result 506 in the job information log for the input job.

In step S721, the CPU 101 cancels the execution of a job for which the execution instruction has been received in step S701. Upon completion of the processing in step S721, the CPU 101 completes a series of processing illustrated in FIG. 7.

Figure 8:
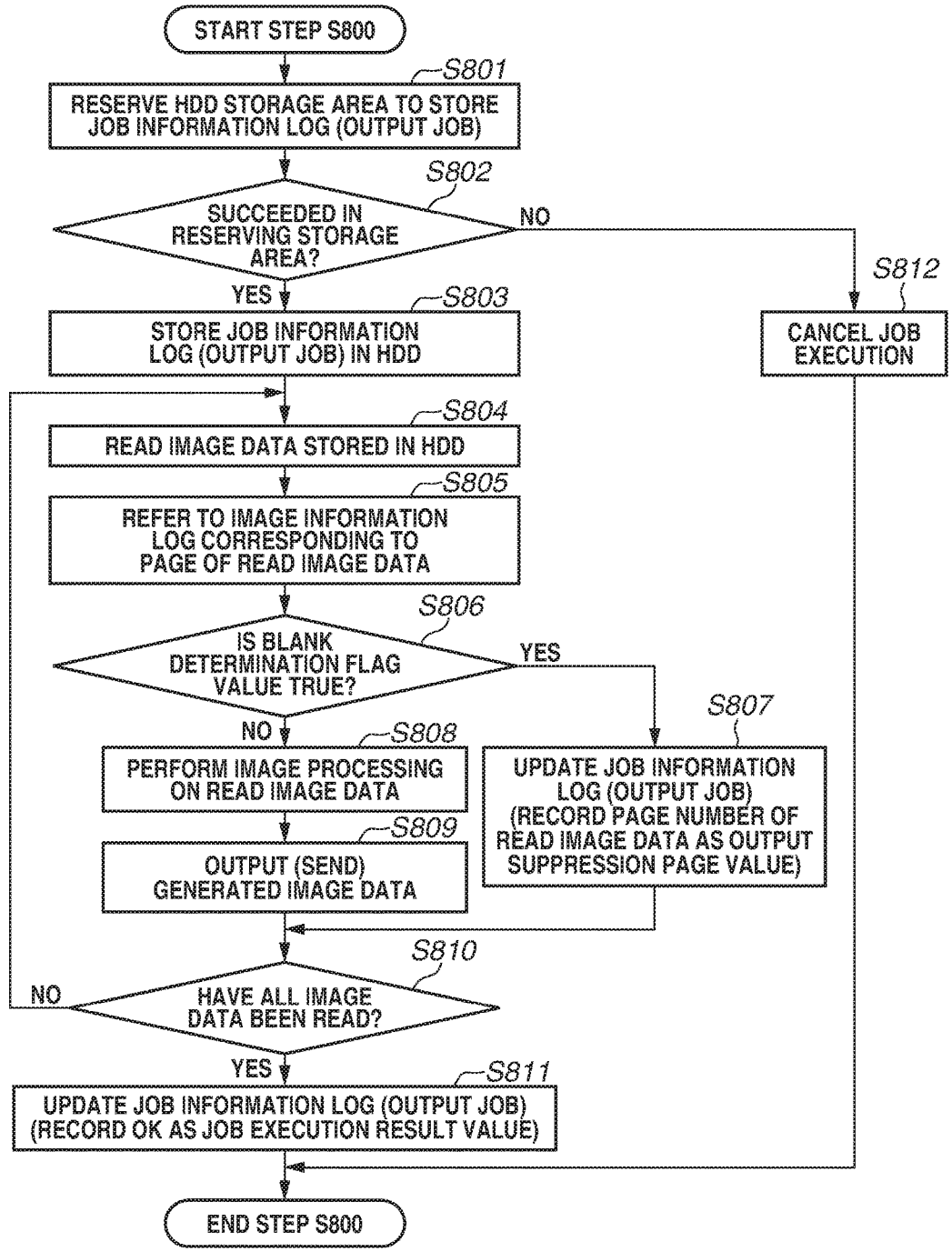
FIG. 8 is a flowchart illustrating an example of control according to the first exemplary embodiment.

A series of processes performed by the MFP 1001 according to the first exemplary embodiment which executes an output job and stores history information of the executed output job will be described in detail below with reference to the flowchart illustrated in FIG. 8. This processing is implemented in such a manner that the CPU 101 of the controller unit 107 executes a program read from the ROM 102 or the HDD 150 and loaded into the RAM 104. The following descriptions will be made on the premise that a series of processing illustrated in FIG. 8 is started from a state where, for example, an execution screen (not illustrated) for using the Fax function 303 is displayed on the operation unit 160. Although, in the following descriptions, the processing in step S801 and subsequent steps is started from a state where an execution instruction for an output job is not received from the user, the configuration is not limited thereto. In a case where it is necessary to receive an execution instruction for an output job from the user when starting the processing in step S801 and subsequent steps, the processing in step S801 and subsequent steps may start after an execution instruction for an output job is received from the user.

In step S801, the CPU 101 reserves a storage area in the HDD 150 to store the job information log for an output job, and the processing proceeds to step S802.

In step S802, the CPU 101 determines whether a storage area of the HDD 150 has successfully been reserved to store the job information log for the output job. In a case where the storage area is determined to have successfully been reserved (YES in step S802), the processing proceeds to step S803. On the other hand, in a case where the storage area is determined to have not successfully been reserved (NO in step S802), the processing proceeds to step S812.

In step S803, the CPU 101 stores the job information log for the output job in the HDD 150, and the processing proceeds to step S804. In step S803, for example, the job type 501, the user ID 502, the section ID 503, the job start time 504, the communication protocol 508, the transmission (reception) destination address/number 509, and the document ID 510 are recorded.

In step S804, the CPU 101 reads image data stored in the HDD 150, and the processing proceeds to step S805.

In step S805, the CPU 101 refers to the image information log corresponding to the page of the image data read in step S804, and the processing proceeds to step S806.

In step S806, the CPU 101 determines whether the value of the blank determination flag in the image information log corresponding to the page of the image data read in step S804 is "TRUE." In a case where the value of the blank determination flag is determined to be "TRUE" (YES in step S806), the processing proceeds to step S807. On the other hand, in a case where the value of the blank determination flag is determined to be not "TRUE", (NO in step S806), the processing proceeds to step S808.

In step S807, the CPU 101 updates the job information log (the output suppression page 511) for the output job, and the processing proceeds to step S810. In step S807, the CPU 101 records the page number of the image data determined to be a blank as a value of the output suppression page 511.

In step S808, the CPU 101 performs predetermined image processing using the image processing unit 103 on the image data read in step S804, and the processing proceeds to step S809. For example, to generate image data for FAX transmission, the image processing unit 103 performs binary processing, processing for converting to the transmission code format, and the like on the image data read in step S804.

In step S809, the CPU 101 outputs (transmits) the image data generated by the image processing in step S808, and the processing proceeds to step S810. For example, the CPU 101 transmits the image data for FAX transmission generated by the image processing in step S808 to the facsimile 1004 by using the line I/F 170.

In step S810, the CPU 101 determines whether reading operation is completed for all of the image data stored in the HDD 150. In a case where the reading operation is determined to be completed (YES in step S810), the processing proceeds to step S811. On the other hand, in a case where the reading operation is determined to be not completed (NO in step S810), the processing returns to step S804.

In step S811, the CPU 101 updates the job information log (for example, the job end time 505, the job execution result 506, and the number of pages 507) for the output job. In step S811, the CPU 101 records "OK" as a value of the job execution result 506 in the job information log for the output job. Upon completion of the processing in step S811, the CPU 101 completes a series of processing illustrated in FIG. 8.

This completes detailed descriptions of a series of processing (FIGS. 7 and 8) in which the MFP 1001 according to the first exemplary embodiment executes a job and stores history information of the executed job in the HDD 150.

According to the first exemplary embodiment as described above, the MFP 1001 stores, in the HDD 150, job information log for an input job, an image information log for the input job, and log image data corresponding to image data input by the input job, according to the execution of an input job. On the other hand, according to the execution of an output job, the MFP 1001 stores, in the HDD 150, a job information log for an output job and does not store, in the HDD 150, image information log for the output job and log image data corresponding to image data output by the output job. Even in such a case, the user is able to easily confirm the cause of the output failure of input image data, based on information for referring to image data already stored as history information of a job for inputting image data which is stored as history information of a job for outputting image data.

Although, according to the first exemplary embodiment, the page number of image data determined to be a blank is recorded as the output suppression page 511 in the job information log for an output job, the configuration is not limited thereto. For example, in a case where image data has not been normally output (transmitted) in step S809 illustrated in FIG. 8 because of a communication error, the page number of the image data which has not been output (transmitted) may be recorded as the output suppression page 511. This allows the user to further confirm whether the cause of the output failure in which input image data has not been output (transmitted) is due to a communication error or removal of image data by blank determination.

Although, according to the first exemplary embodiment, the page number of image data which has not been output is recorded as the output suppression page 511 in the job information log for an output job, the configuration is not limited thereto. For example, the page number of image data determined to be a blank may be further recorded in the job information log for an output job.

The present invention is not limited to the above-described exemplary embodiments, and can be modified in diverse ways (including organic combinations of these exemplary embodiments) without departing from the spirit and scope thereof. These modifications are not excluded from the scope of the present invention.

For example, although, according to the present exemplary embodiment, the image of the document sheet 203 set on the document tray 202 is read on the document glass 212, the present invention is also similarly applicable to a case where the image of the document sheet 203 set on the document positioning plate 221 is read on the platen glass 221.

For example, although, according to the present exemplary embodiment, the above-described various control is mainly performed by the CPU 101 of the controller unit 107 of the MFP 1001, a part or whole of the above-described various control may be configured to be executable by a print control apparatus, such as an external controller which is separately provided from the body of the MFP 1001.

While the present invention have specifically been described based on the above-described embodiments, the spirit and scope of the present invention are not limited to specific descriptions within the specification for those skilled in the art.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system including an image forming apparatus and an information processing apparatus, the system comprising:
   one or more memory devices that store a set of instructions; and
   one or more processors that execute the instructions to:
   provide first data that causes the image forming apparatus to print by processing a not blank page, and provide second data that causes the image forming apparatus to not print a blank page;
   generate third data by processing the first data and generate fourth data by processing the second data; and
   store the third data and the fourth data in a predetermined area in a storage unit,
   wherein
   the stored third data is not the same data as the first data and the stored fourth data is not the same data as the second data,
   the stored third data and the stored fourth data in the predetermined area are accessible by a user after the printing by the image forming apparatus, and
   the stored third data includes an image representing page data of the blank page and the stored fourth data includes an image representing page data of the not blank page.

2. The system according to claim 1, wherein the third data including page data of the blank page is stored in the storage unit of the information processing apparatus that is configured to connect to the image forming apparatus via a network.

3. The system according to claim 1, wherein the one or more processors further execute the instructions to:
   store a log indicating that the blank page was not output.

4. The system according to claim 1, wherein the one or more processors further execute the instructions to:
   execute a control of the image forming apparatus to print image data for outputting the image data.

5. The system according to claim 1, the system further comprising a display device,
   wherein an image log is displayed on the display device in according with a request of the user.

6. The system according to claim 1,
   wherein the third data is generated, from inputted page data, and the third data is stored in a predetermined format in the predetermined area for storing.

7. The system according to claim 1,
   wherein the third data is generated, from inputted page data, and the third data is stored in predetermined size in the predetermined size in the predetermined area for storing.

8. A method for controlling a system including an image forming apparatus and an information processing apparatus, comprising:
   providing first data that causes the image forming apparatus to print by processing a not blank page, and providing second data that causes the image forming apparatus to not print a blank page;
   generating third data by processing the first data and generating fourth data by processing the second data; and
   storing the third data and the fourth data in a predetermined area in a storage unit,
   wherein
   the stored third data is not the same data as the first data and the stored fourth data is not the same data as the second data,
   the stored third data and the stored fourth data in the predetermined area are accessible by a user after the printing by the image forming apparatus, and
   the stored third data includes an image representing page data of the blank page and the fourth data includes an image representing page data of the not blank page.

9. The method according to claim 8, wherein the third data including page data of the blank page is stored in the storage unit of the information processing apparatus that is configured to connect to the image forming apparatus via a network.

10. The method according to claim 8, further comprising:
    storing a log indicating that the blank page was not output.

11. The method according to claim 8, further comprising:
    executing a control of the image forming apparatus to print image data for outputting the image data.

12. The method according to claim 8, further comprising:
    displaying an image log on a display device in accordance with a request of the user.

13. The method according to claim 8,
    wherein the third data is generated, from inputted page data, and the third data is stored in a predetermined format in the predetermined area for storing.

14. The method according to claim 8,
    wherein the third data is generated, from inputted page data, and the third data is stored in a predetermined size in the predetermined area for storing.

15. A nor-transitory computer-readable storage medium for storing a computer program for controlling an image forming apparatus to execute a method, the method comprising:
    providing first data that causes the image forming apparatus to print by processing a not blank page, and providing second data that causes the image forming apparatus to not print a blank page;
generating third data by processing the first data and generating fourth data by processing the second data; and
storing the third data and the fourth data in a predetermined area in a storage unit, wherein the stored third data is not the same data as the first data and the stored fourth data is not the same data as the second data, the stored third data and the stored fourth data in the predetermined area are accessible by a user after the printing by the image forming apparatus, and the stored third data includes an image representing page data of the blank page and the fourth data includes an image representing page data of the blank page.

* * * * *